United States Patent Office 3,450,677
Patented June 17, 1969

3,450,677
POLYMERS DERIVED FROM DIAMINES AND PHOSPHITES OR PHOSPHONITES
Richard L. McConnell and Harry W. Coover, Jr., Kingsport, Tenn., assignors to Eastman Kodak Company, Rochester, N.Y., a corporation of New Jersey
No Drawing. Continuation of application Ser. No. 266,042, Mar. 18, 1963, which is a continuation-in-part of application Ser. No. 803,582, Apr. 2, 1959, both abandoned. This application Dec. 1, 1966, Ser. No. 598,514
Int. Cl. C08g *33/16, 22/02;* C07f *9/08*
U.S. Cl. 260—77.5    3 Claims

ABSTRACT OF THE DISCLOSURE

Resinous polymers useful for the preparation of tough and flame-resistant films, sheets, and molded articles, are prepared from a diamine (such as 1,6-hexanediamine and 1,4-cyclohexanebismethylamine) and an organic phosphite, phosphonite, or phosphonic dihalide.

---

This application is a continuation of McConnell et al. U.S. Ser. No. 266,042, filed Mar. 18, 1963, and now abandoned, which in turn is a continuation-in-part of McConnell et al. U.S. Ser. No. 803,582, filed Apr. 2, 1959, and now abandoned.

This invention relates to resinous polymers derived from certain diamines and organic phosphites and phosphonites.

The new class of resinous compounds of the invention may be represented by one of the following recurring structural units:

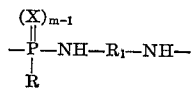

and

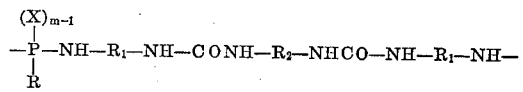

wherein $m$ represents an integer of 1 or 2, X represents an atom of sulfur or oxygen, R represents an atom of hydrogen, an alkyl group of from 1–8 carbon atoms, e.g. methyl, ethyl, propyl, isopropyl, butyl, hexyl, 2-ethylhexyl, etc. groups, a phenyl group or a tolyl group, $R_1$ represents a divalent hydrocarbon group, e.g. a straight or branched chain alkylene group of from 2–8 carbon atoms such as e.g., —C$_2$H$_4$—, C$_3$H$_6$—, —CH(CH$_3$)CH$_2$—, —C$_4$H$_8$—, —C$_6$H$_{12}$—, —CH$_2$C(CH$_3$)$_2$CH$_2$—, —CH$_2$CH(C$_2$H$_5$)CH$_2$CH$_2$CH$_2$CH$_2$—, etc. groups, a cycloalkylene group of from 5–8 carbon atoms, e.g. —C$_5$H$_8$—, —C$_6$H$_{10}$— or —CH$_2$—C$_6$H$_{10}$—CH$_2$—, etc., groups, an arylene group of from 6–10 carbon atoms such as —C$_6$H$_4$—, —C$_6$H$_3$(CH$_3$)—, —C$_6$(CH$_3$)$_4$—, etc. groups or ethylene groups necessary to form a heterocyclic group such as a

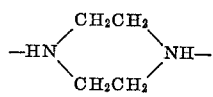

group, and $R_2$ represents a divalent hydrocarbon group, e.g. a straight or branched chain alkylene group of from 4–12 carbon atoms such as —(CH$_2$)$_4$—, —(CH$_2$)$_6$—, —(CH$_2$)$_8$—, —(CH$_2$)$_{12}$—, etc. groups or an aryl group of from 6–12 carbon atoms such as a phenylene group represented by —C$_6$H$_4$—, a tolylene group represented by —C$_6$H$_3$(CH$_3$)—, a diphenylene group represented by —C$_6$H$_4$—C$_6$H$_4$—, a diphenylmethylene group represented by —C$_6$H$_4$—CH$_2$—C$_6$H$_4$—, a naphthylene group represented by —C$_{10}$H$_6$—, etc. groups. The above-defined resinous polymers of structure I are generally viscous oils when hot but crystalline solids when cold. On modification with organic diisocyanates the resulting resinous polymers as represented by structure II are solid polymers having high softening points and of limited solubility, e.g. some members are soluble in hot dimethylformamide but insoluble in solvents such as acetone, benzene and 1,1-dichloroethane. All of the modified polymers are excellent materials for the preparation of transparent, tough and flame-resistant films, sheets and molded articles.

It is, accordingly, an object of the invention to provide a new class of resinous polymers. Another object is to provide resinous materials that are particularly useful for the preparation of tough and flame-resistant films, sheets and molded articles. Another object is to provide a process for preparing the same. Other objects will become apparent hereinafter.

In accordance with the invention, we prepare the polymers represented by above structure I by heating an organic phosphite or phosphonite represented by the general formula:

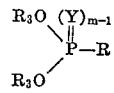

wherein $m$ and R are as above defined, and $R_3$ represents a straight or branched chain alkyl group of from 1–12 carbons atoms, e.g., methyl, ethyl, propyl, isopropyl, butyl, sec. butyl, 2-ethylhexyl, 2-ethyl-4-methylpentyl, lauryl, etc. groups, a cycloalkyl group such as a cyclopentyl or cyclohexyl group or on aryl group, e.g., phenyl or tolyl groups, or a phosphonic dihalide represented by the general formula:

wherein X is as above defined and $R_4$ represents one of the following: an alkyl group of from 1–12 carbon atoms, a cycloalkyl group, e.g., cyclopentyl, cyclohexyl, etc. groups, an aryl group, e.g., phenyl, tolyl, naphthyl, etc. groups, a haloalkyl group, e.g., chloromethyl, bromomethyl, etc. groups, with a diamine represented by the following general formula:

wherein $R_1$ is as above defined. The condensation of the diamine with the phosphite or the phosphonite to obtain the compounds of structure I are generally effected in the absence of a solvent; however, inert solvents may be used if desired. The operable temperature range of this reaction is about —25° to about 250° C. Catalysts are not required since the reaction is exothermic. Although the reaction takes place with any molar ratio of diamine and phosphite or phosphonite, we generally prefer to use either an equimolar amount or an excess of the diamine. If this product is to be reacted with a diisocyanate, an excess of the diamine is preferred.

In the reaction of the above intermediate type of product with the diisocyanate to prepare the high-molecular-weight polymers of structure II, the operable temperature range is about —25° to about 300° C.; however, we prefer to operate in the 0°–200° C. range. These condensations are autocatalytic. They can be carried out in bulk (without solvent); however, with the more reactive diisocyanates, the reactions are extremely exothermic and solvents are often advantageous. The solvents must be inert in the presence of diisocyanates. Suitable solvents include the hydrocarbons, halogenated hydrocarbons, ethers, esters, and ketones. In this final condensation, it is advantageous to have equivalent amounts of the diisocyanate and the initial condensation product present in order to obtain high-molecular-weight polymers. For example, optimum results are obtained when there is one isocyanate group present for each amino end group.

Suitable organic phosphites, phosphonites, and phosphonic dichlorides to prepare the intermediate polymers of the invention include e.g. dimethyl, diethyl, dipropyl, diisopropyl, dibutyl, diisobutyl, bis(2-ethylhexyl), bis(2-ethyl-4-methylpentyl), dilauryl, diphenyl, ditolyl, etc. phosphites and corresponding dialkyl and diaryl esters of methyl, ethyl, propyl, butyl, hexyl, phenyl and 2-ethylhexyl phosphonites including diethyl phenylphosphonite, dibutyl phenylphosphonite, dibutyl butylphosphonite, diphenyl phenylphosphonite, bis(2 - ethylhexyl) phenylphosphonite, and phenylphosphonic, methylphosphonic, ethylphosphonic, isobutylphosphonic, octylphosphonic dodecylphosphonic, cyclopentylphosphonic, cyclohexylphosphonic, chloromethylphosphonic, bromomethylphosphonic, phenylphosphonothioic, etc. dichlorides and the like. Suitable diamines include 1,4-dibutanediamine, 1,5-pentanediamine, 1,8-octanediamine, 1,3-cyclohexanebismethylamine, m-phenylenediamine, durenediamine, bis(β-aminoethyl)durene, 3,3'-sulfonyldianiline, 3,4'-sulfonyldianiline, 4,4'-sulfonyldianiline, piperazine, etc. Suitable organic diisocyanates represented by the following general formula:

OCN—R₂—NCO wherein R₂ is as above defined include tetramethylene diisocyanate, hexamethylene diisocyanate, 2,4-tolylene diisocyanate, 4,4'-diphenylmethane diisocyanate, 65/35 mixture of 2,4- and 2,6-tolylene diisocyanate, 80/20 mixture of 2,4- and 2,6-tolylene diisocyanate, 3,3'-bitolylene-4,4'-diisocyanate, 1,5-naphthalene diisocyanate, etc.

The following examples will serve to illustrate further the manner whereby we practice our invention.

Example 1

Diethyl hydrogen phosphite (0.2 mole) and 1,6-hexanediamine (0.2 mole) were mixed with stirring. The reaction is exothermic and the temperture rose to 120° C. When the temperature started to fall, the reaction mixture was heated on a heating mantle to a maximum temperature of 135° C. The liberated ethanol distilled over at a head temperature of 75–76° C. A total of 19 ml. of distillate ($n_D^{20}$ 1.3650) was collected over a period of about 4 hours. The infrared spectrum of this distillate was identical with that of the reference spectrum for ethanol. This polymeric material is an extremely viscous, colorless oil when hot and a white crystalline solid at 25° C. being represented by the following structural unit:

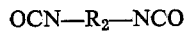

The polymeric material reacts with the various mentioned diisocyanates to give white, high-molecular-weight polymers with high softening points.

Example 2

Diethyl hydrogen phosphite (0.2 mole) and 1,6-hexanediamine (0.4 mole) were mixed with stirring. The reaction is exothermic and the temperature of the reaction mixture rose to 100° C. When the exothermic nature of the reaction had subsided, the reaction mixture was heated on a heating mantle and nitrogen was passed through the reaction flask. After 11 hours heating at a maximum pot temperature of 170° C., 19 ml. of distillate boiling at 76° C. ($n_D^{20}$ 1.3650) had been collected. The product was a white crystalline solid which was soluble in water and dilute ethanol. It consisted essentially of the compound:

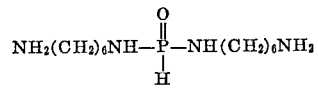

and low molecular weight polymers having a large majority of amino end groups.

About 2.5 g. of the above intermediate was mixed with about 1.7 g. of 2,4-tolylene diisocyanate with stirring. An extremely vigorous reaction took place and a white solid polymer was obtained immediately. This polymer was insoluble in acetone, benezene, and 1,1-dichloroethane, but partially soluble in hot dimethylformamide. Films cast from this hot dimethylformamide solution were transparent, tough, and had excellent flame resistance.

When this polymer is placed in a flame, it intumesces and forms a large voluminous char. It consisted essentially of the following recurring structural unit:

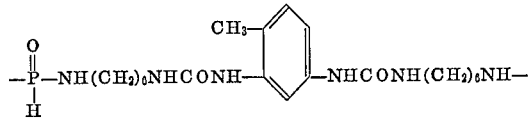

Example 3

Diphenyl hydrogen phosphate (0.1 mole) and 1,4-cyclohexanebismethylamine (0.2 mole) were reacted according to the procedure of Example 2 until 0.2 mole of phenol had been liberated. This intermediate was slurried in 400 ml. of dry toluene and hexamethylene diisocyanate (0.1 mole) dissolved in 100 ml. of dry toluene was added with stirring. The reaction is exothermic and a white, high-molecular-weight polymer precipitated. This polymer is insoluble in the usual organic solvents but is soluble in hot dimethylformamide, and in hot trifluoroacetic acid. Its softening point was above 250° C. In this connection, it should be noted that with polymers of the type illustrated by the above example and by Examples 5 and 11, the softening point is so high in many cases that charring will occur before any softening is observed.

Example 4

Dibutyl hydrogen phosphite (0.1 mole) and p-phenylenediamine (0.12 mole) were reacted according to the procedure of Example 1 until the theoretical amount of butyl alcohol had been removed. This white crystalline solid gave white, high softening polymers when reacted with hexamethylene diisocyanate according to the procedures described in Examples 2 and 3. The intermediate polymer and the final polymer may be represented by the following recurring structural units, respectively:

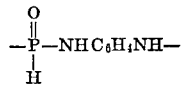

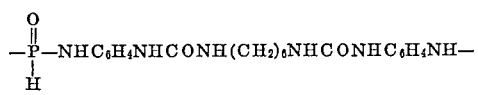

Example 5

Dimethyl hydrogen phosphite (0.2 mole) and piperazine (0.3 mole) were reacted according to the procedure of Example 1 until methanol stopped distilling from the reaction mixture. This polymeric product was reacted with 2,4-tolylene diisocyanate (0.1 mole) according to the procedure of Example 3 producing a white, high softening polymer (>250° C.).

Example 6

Diethyl phosphonothionate (0.2 mole) and 1,6-hexanediamine (0.3 mole) were reacted according to the procedure of Example 2 to produce a low molecular weight polymer. When this material was treated with 2,4-tolylene diisocyanate, a high molecular weight polymer was formed which consisted essentially of the following recurring structural unit:

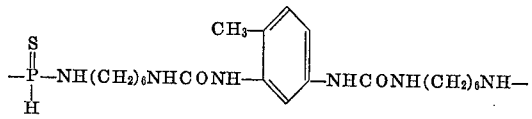

Example 7

Dibutyl phenylphosphonite (0.1 mole) and 1,6-hexanediamine (0.11 mole) were mixed with stirring. The reaction is mildly exothermic and the temperature of the reaction mixture rose to 33° C. The materials were not completely miscible at this temperature. The reaction mixture was heated on a Glas-Col heating mantle with nitrogen passing through for 8 hours. The pot temperature during the latter stages of the reaction period ranged from 140° C. to 250° C. Butanol was collected during the reaction period (18 ml.; $n_D^{20}$ 1.4021). On cooling, the product solidified to a white crystalline solid. This polymeric material reacts with diisocyanates to give white, high-molecular-weight polymers which have high softening points. For example, 5 g. of this polymeric material, when mixed with 1 g. of 2,4-tolylene diisocyanate, reacts quite vigorously to produce a white, solid polymer. The intermediate polymer and the final polymer may be represented by the following recurring structural units, respectively:

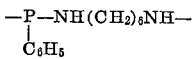

and

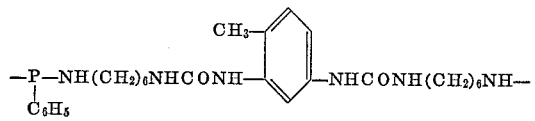

Example 8

Diethyl phenylphosphonite (0.2 mole) and 1,6-hexanediamine (0.4 mole) were mixed with stirring. The reaction is exothermic. When the exothermic nature of the reaction mixture had subsided, the mixture was heated on a Glas-Col heating mantle with nitrogen passing through the flask. After 8 hours at a maximum pot temperature of 160° C., a total of 18.6 ml. of ethanol distilling at 76 to 78° C. ($n_D^{20}$ 1.3650) had been collected. The product is a white, crystalline solid which is soluble in dilute ethanol. About 1 g. of this intermediate was mixed with about 1 g. of hexamethylene diisocyanate with stirring. An extremely vigorous reaction took place and a white solid polymer was obtained immediately. This polymer is insoluble in acetone, benzene, and 1,1-dichloroethane but partially soluble in hot dimethylformamide. Films cast from this solution have excellent flame resistance. When this polymer is placed in a flame, it intumesces and forms a large voluminous char.

The intermediate product and the final polymer may be represented by the following recurring structural units, respectively:

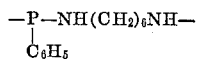

having a majority of amino end groups, and

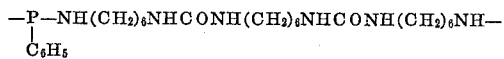

Example 9

Diphenyl phenylphosphonite (0.1 mole) and 1,4-cyclohexanebismethylamine (0.2 mole) were reacted according to the procedure of Example 8 until 0.2 mole of phenol had been liberated. This intermediate was slurried in 400 ml. of dry toluene and 2,4-tolylene diisocyanate (0.1 mole) dissolved in 100 ml. of toluene was added with stirring. The reaction was exothermic and a white, high-molecular-weight polymer precipitated. This polymer was insoluble in the usual solvents but is partially soluble in hot dimethylformamide.

Example 10

Bis(2-ethylhexyl) phenylphosphonite (0.1 mole) and p-phenylenediamine (0.12 mole) were reacted according to the procedure of Example 7 until the theoretical amount of 2-ethylhexanol had been removed. This white crystalline solid gave white, high-softening polymers when reacted with diisocyanates according to the procedure described in Examples 8 and 9.

Example 11

Dibutyl butylphosphonite (0.2 mole) and 1,5-pentanediamine (0.3 mole) were reacted according to the procedure of Example 8 until butyl alcohol stopped distilling from the reaction mixture. This polymeric intermediate was reacted with hexamethylene diisocyanate (0.1 mole) according to the procedure of Example 9 producing a white, high-softening polymer (>250° C.). Similar results were obtained using other phosphonite esters. For example, dimethyl, diethyl, diisobutyl, bis(2-ethylhexyl), bis(2-ethyl-4-methylpentyl), diphenyl, or ditolyl esters of methyl, ethyl, propyl, butyl, hexyl, or 2-ethylhexylphosphonite may be used. Other diamines which may be used include 1,8-octanediamine, 1,3-cyclohexanebismethylamine, m-phenylenediamine, piperazine, 4,4'-sulfonyldianiline, 3,3'-sulfonyldianiline, 3,4'-sulfonyldianiline, durenediamine, and bis(β-aminoethyl)durene. The diisocyanates other than those illustrated above which may be used include tetramethylene diisocyanate, 4,4'-diphenylmethane diisocyanate, 65/35 mixture of 2,4- and 2,6-tolylene diisocyanate, 80/20 mixture of 2,4- and 2,6-tolylene diisocyanate, 3,3'-bitolylene-4,4'-diisocyanate, and 1,5-naphthalene diisocyanate.

Example 12

In a 500 ml. of flask containing 300 ml. of m-xylene were charged 42 g. (0.216 moles) of phenylphosphonic dichloride

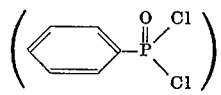

and 26.6 g. (0.2 mole) of ethylenediamine dihydrochloride. The flask was purged of air with nitrogen gas and heated with stirring to reflux on a Glas-Col heating mantle for seven hours. After standing overnight, the flask was heated to reflux for nine hours. The product was a pasty polymeric mass which precipitated from the m-xylene solvent. The reaction and recurring unit may be described as follows:

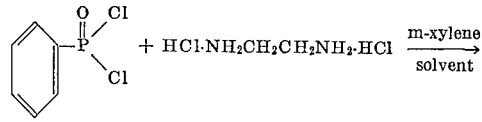

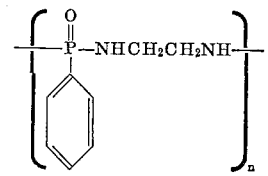

Example 13

A 250 ml. three-neck flask was provided with a stirrer, a condenser having a drying tube (filled with CaSO₄ or the like) and a gas (HCl) lead to a scrubber, and a Glas-Col heating mantle controlled by a thermocouple responsive Wheelco regulating device. Into this flask were charged 80 g. (0.41 mole) of phenylphosphonic dichloride, 26.6 g. (0.2 mole) of ethylenediamine dihydrochloride and 10 g. of xylene. The flask was heated at 120° C. for 24 hours, then at 150° C. for 24 hours and then at 180° C. for 24 hours. HCl came off vigorously and on the third day of heating the mixture became very dark in color. When coole ddown, the mixture became very viscous and then solidified to a dark mass which could be crushed in a mortar to a fine tan powder weighing 63 grams. The powder was analyzed and showed P, N and only a trace of residual chlorine. The product had a softening range of 135 to 235° C., was soluble in ethyl alcohol and chloroform, and was insoluble in benzene, water and ether. On the basis of the recurring structural unit:

the calculated percentage of P is 17.0 while the percentage actually found in the above polymeric product by analysis was 16.37.

Example 14

A solution of phenylphosphonic dichloride (0.2 mole) in 150 ml. of xylene was added dropwise with stirring to a solution of p-phenylenediamine (0.21 mole) in 150 ml. of xylene. The reaction mixture was refluxed for 12 hours, and HCl was evolved. Then the xylene solvent was slowly distilled from the reaction mixture. More HCl came off during this gradual removal of solvent. The solid polymeric residue in the flask was ground to a light tan powder, and it contained 13.3 percent P. On the basis of the recurring structural unit:

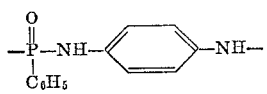

the calculated percentage of P is 13.5.

Similar results were obtained when the phenylphosphonic dichloride was replaced by ethylphosphonic, octylphosphonic, chloromethylphosphonic, cyclohexylphosphonic or phenylphosphonothioic dichloride and the p-phenylenediamine was replaced with piperazine, 1,4-cyclohexanebismethylamine, or 1,6-hexanediamine.

By proceeding according to the above examples, other intermediate polymers of above structure I may also be prepared with any of the mentioned components. These polymers on further reaction with any of the mentioned organic diisocyanates also give high-molecular-weight polymers that are characterized by ability to be formed into transparent, tough, and flame resistant films and sheets. These are useful as wrapping materials, photographic film supports, etc. If desired, various fillers, dyes, pigments, softeners, etc., can be incorporated into the polymer compositions which are also useful as molding compositions.

The invention has been described in detail with particular reference to preferred embodiments thereof, but it will be understood that variations and modifications can be effected within the spirit and scope of the invention as described hereinabove and as defined in the appended claims.

We claim:
1. A polymer consisting essentially of recurring units having the formula

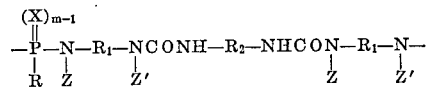

wherein $m$ represents an integer selected from 1 and 2; X represents a member selected from the group consisting of an atom of sulfur and an atom of oxygen; R represents a member selected from the group consisting of an atom of hydrogen, an alkyl group of from 1–8 carbon atoms, a phenyl group, and a tolyl group; $R_1$ represents a divalent hydrocarbon group selected from the group consisting of an alkylene group of from 2–8 carbon atoms, a cycloalkylene group selected from the group consisting of a —$C_5H_8$— group, a —$C_6H_{10}$— group, and a —$CH_2C_6H_{10}CH_2$— group, and an arylene group selected from the group consisting of a phenylene group, a tolylene group, and a —$C_6(CH_3)_4$— group; Z and Z' represent H or when $R_1$ represents ethylene, Z and Z' can together represent an ethylene group, $R_1$ and Z plus Z' thereby representing the ethylene groups necessary to form a

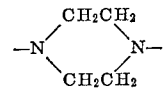

group; and $R_2$ represents a divalent hydrocarbon group selected from the group consisting of an alkylene group of from 4–12 carbon atoms, a phenylene group, a tolylene group, a —$C_6H_4$—$C_6H_4$— group, a

—$C_6H_4$—$CH_2$—$C_6H_4$— group, and a $C_{10}H_6$— group.

2. A polymer as in claim 1, said polymer being linear and consisting essentially of recurring units of the formula:

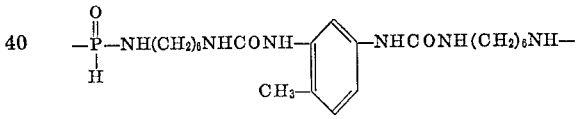

3. A polymer as in claim 1, said polymer being linear and consisting essentially of recurring units of the formula:

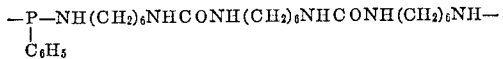

References Cited

UNITED STATES PATENTS

| | | | |
|---|---|---|---|
| 2,284,896 | 6/1942 | Hanford et al. | 260—77.5 |
| 2,292,443 | 11/1942 | Hanford | 260—77.5 |
| 3,030,340 | 4/1962 | McConnell et al. | 260—77.5 |
| 3,044,984 | 7/1962 | Bloomfield | 260—61 |
| 3,116,268 | 12/1963 | Farago | 260—77.5 |
| 3,284,497 | 11/1966 | Nielsen | 260—551 |
| 3,290,258 | 12/1966 | Nielsen et al. | 260—2 |

FOREIGN PATENTS

| | | |
|---|---|---|
| 621,378 | 6/1961 | Italy. |
| 1,167,050 | 7/1958 | France. |

DONALD E. CZAJA, *Primary Examiner.*

M. J. WELSH, *Assistant Examiner.*

U.S. Cl. X.R.

260—2, 551